Oct. 24, 1950    M. PAULVÉ    2,527,195
FIREARM
Filed July 24. 1947    2 Sheets-Sheet 1
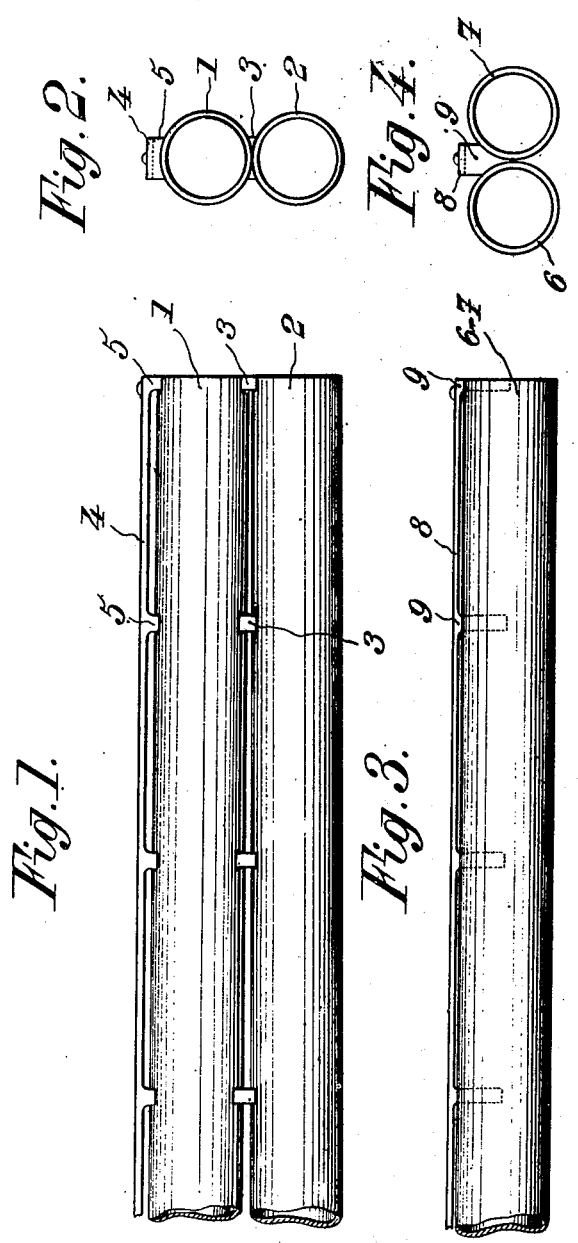
INVENTOR
MARCEL PAULVÉ,
BY Robert E. Burns
ATTORNEY.

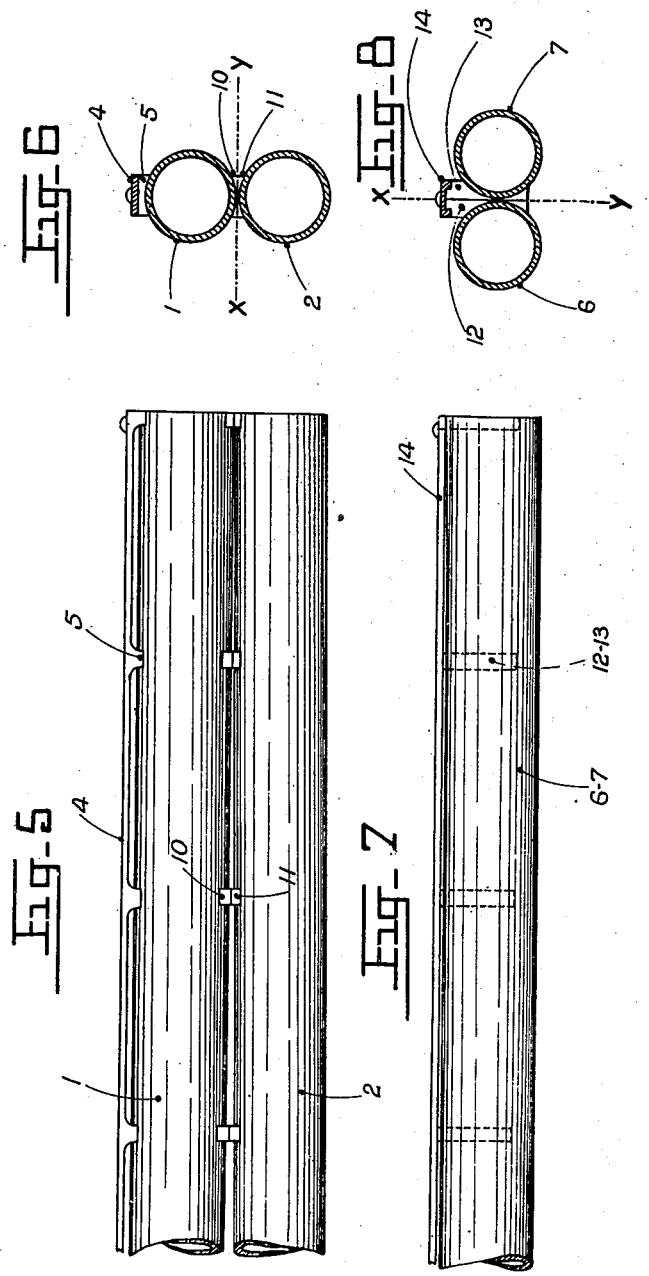

Patented Oct. 24, 1950

2,527,195

UNITED STATES PATENT OFFICE 2,527,195

FIREARM

Marcel Paulvé, Parmain, France, assignor of one-half to Société Francaise des Munitions, de Chasse, de Tir et de Guerre (Anciens Etablissements Gevelot & Gaupillat) Société Anonyme, Paris, France, a French corporation Application July 24, 1947, Serial No. 763,381
In France September 2, 1943

Section 1, Public Law 690, August 8, 1946
Patent expires September 2, 1963

3 Claims. (Cl. 219—10)

The invention relates to the assembly of the barrels of a fire arm, particularly juxtaposed or superposed barrels of a sporting rifle.

The two barrels of a sporting rifle are formed by tubes which are generally assembled by means of longitudinal bands and wedges by tin soldering or copper brazing. Tin soldering entrains considerable fragility of the assembly which under the action of vibrations produced by firing, is frequently dislocated. Copper brazing produces a resistant assembly but the brazing operation makes it necessary to bring the assembly to a high temperature which has the disadvantage of deforming the tubes; straightening is then necessary and finishing is expensive.

The invention has for its object to remedy the disadvantages above referred to and to obtain a resistant assembly without deformation of the tubes, whereby the additional operations of straightening are eliminated. It enables the straightness of the tubes to be maintained, the tubes retaining their ballistic qualities.

It has been found that these results, particularly important for the barrels of a fire arm, may be obtained by the application, to the assembly of tubes, bands and wedges, of an electric welding carried out with or without a vehicle metal. By a welding of this character, obtained preferably by resistance and advantageously with an appropriate treatment of the surfaces brought in contact, it has been found that, in these conditions, the tubes are not subjected to any deformation and that it is unnecessary to subject them afterwards to straightening operations.

According to one form of carrying out, which appears to be particularly advantageous, spot welding is carried out for example at the position of wedges distributed from point to point along the barrels, but it will be understood that a continuous welding is not outside the scope of the invention.

In the case of superposed barrels, the assembly of the barrels is effected for example by wedges located between the two barrels, and to the upper barrel is welded in the same manner the usual sighting band. In the case of juxtaposed barrels, the assembly wedges may be formed integral with the usual sighting band and be welded electrically to the two barrels as indicated above.

However, the welding of the wedges simultaneously on the two tubes of a sporting rifle may cause certain difficulties in carrying out by reason of the differences in the ohmic resistances at the points of contact on the two tubes and in some cases, this simultaneous welding may produce irregular securing and also irregular accumulations of metal which lead to the production of badly assembled barrels having an imperfect convergence.

A particularly advantageous method of carrying out the invention consists in forming the wedges or spacing bands, hitherto formed in two pieces which, for example, are connected together along a vertical or horizontal plane, according as to whether the barrels are juxtaposed or superposed, the two half wedges are welded electrically to two tubes in two operations and then welded between them along their uniting face. Thus after welding the half wedges to the tubes, each of these receives the necessary machining for the desired convergence and the assembly of the two tubes is effected by electric welding of the half wedges between them.

In the case of juxtaposed barrels, the wedges have a profile for the reception of the sighting band.

This method of carrying out has this advantage that each operation has only one welding point which on the one hand facilitates the operation and on the other hand reduces to a minimum the tolerances for the accumulation occasioned at the moment of welding, thus enabling the desired convergence to be imparted to the tubes.

Various forms of carrying out the invention are described hereafter by way of example, with reference to the accompanying drawing, wherein:

Figs. 1 and 2 are respectively side and end views showing the ends of superposed barrels of a sporting rifle according to the invention.

Figs. 3 and 4 are two similar views showing the side and ends of juxtaposed barrels of a sporting rifle, also according to the invention.

Figs. 5 and 6 show in elevation and in cross section the tubes of a rifle of superposed barrels assembled by wedges in two pieces.

Figs. 7 and 8 are views in elevation and cross section of a rifle with juxtaposed barrels assembled by wedges in two parts.

In Figs. 1 and 2, 1 indicates the upper barrel, 2 the lower barrel. The two barrels are assembled by the electric welding of the wedges 3 suitably spaced along the barrels. Further on the upper barrel 1 is secured in the same manner by electric welding the usual sighting band 4, this band may be welded directly or there may be welded electrically to the barrel, lugs 5 formed integrally with this band and forming wedge.

In Figs. 3 and 4, the references 6, 7 indicate two juxtaposed barrels and the sighting band 8 is secured to the two barrels which it serves to assemble by electric welding wedges 9 formed integral with this band 8.

As indicated, the successive wedges may be replaced by a longitudinal band or by the sighting band itself and the welding may be continued along the entire length of this band without departing from the scope of the invention.

The carrying out of the electric welding may be effected by any suitable known means, for example by the introduction of electrodes into the interior of barrels.

In Figs. 5 and 6 the assembly of the barrels is effected by wedges similar to those described above, but each thereof is divided into two parts 10, 11, which are connected together along a horizontal plane. The half wedges 10 are first welded electrically to the barrel 1 and the half wedges 11 to the barrel 2, then after suitable machining the assembly of barrels is effected by electrically welding the half wedges 10 to the half wedges 11.

In Figs. 7 and 8 the two juxtaposed barrels are indicated at 6, 7 and the assembly of the barrels is effected, as in the case of Figs. 5 and 6, by half wedges 12, 13 which are attached along a vertical plane; the profiles of these half wedges are so constructed as to receive towards the top the sighting band 14, as in the case of Figs. 5 and 6 the half wedges 12, 13 are first welded electrically to the barrels 6, 7 then after suitable machining the assembly of the barrels is effected by electrically welding the half wedges 12 to the half wedges 13.

It will be understood that for connecting together the half wedges cross sectional shapes other than plane sections may be provided without departing from the scope of the invention.

I claim:

1. The method of assembling the two steel barrels of a multiple barrel firearm comprising the steps of positioning metallic wedge-like means intermediate said barrels, and electrically welding one barrel to one side and the other barrel to the other side of said wedge means.

2. The method of securing together the two steel barrels of a multiple barrel firearm comprising the steps of first electrically welding a plurality of metallic wedge-like pieces at intervals onto one of said barrels, along a given longitudinal line thereof, and then electrically welding the second barrel to said pieces.

3. The method of securing together the two barrels of a multiple barrel firearm comprising the steps of electrically welding a plurality of wedge-like piece half sections at intervals respectively to each of said barrels along a given longitudinal line thereof, and electrically welding together the corresponding faces of said half sections.

MARCEL PAULVÉ.

REFERENCES CITED

The following references are of record in the file of this patent:

UNITED STATES PATENTS

| Number | Name | Date |
|---|---|---|
| 83,194 | Maynard | Oct. 20, 1868 |
| 246,195 | Pieper | Aug. 23, 1881 |
| 1,330,468 | Hill | Feb. 10, 1920 |
| 1,467,502 | Rose | Sept. 11, 1923 |
| 1,468,902 | Fabry et al. | Sept. 25, 1923 |
| 1,599,008 | Diener | Sept. 7, 1926 |
| 1,785,765 | Burton | Dec. 23, 1930 |
| 1,934,097 | Simon | Nov. 7, 1933 |

FOREIGN PATENTS

| Number | Country | Date |
|---|---|---|
| 230,041 | Great Britain | June 25, 1925 |
| 236,849 | Great Britain | July 16, 1925 |
| 338,601 | France | May 30, 1904 |